(12) United States Patent
Xie

(10) Patent No.: US 9,025,580 B2
(45) Date of Patent: May 5, 2015

(54) METHOD FOR USING FEMTOCELL AS A TELEPHONE EXCHANGE

(71) Applicant: Sernet (Suzhou) Technologies Corporation, Jiangsu (CN)

(72) Inventor: Pei-Ren Xie, JiangSu (CN)

(73) Assignee: Sernet (Suzhou) Technologies Corporation, Suzhou (CN)

( * ) Notice: Subject to any disclaimer, the term of this patent is extended or adjusted under 35 U.S.C. 154(b) by 342 days.

(21) Appl. No.: 13/667,276

(22) Filed: Nov. 2, 2012

(65) Prior Publication Data

US 2013/0107807 A1 May 2, 2013

(30) Foreign Application Priority Data

Nov. 2, 2011 (CN) .......................... 2011 1 0340813

(51) Int. Cl.
*H04W 4/00* (2009.01)
*H04W 76/02* (2009.01)
*H04M 3/42* (2006.01)
*H04W 84/04* (2009.01)

(52) U.S. Cl.
CPC ........ *H04W 76/022* (2013.01); *H04M 3/42246* (2013.01); *H04M 2207/18* (2013.01); *H04W 84/045* (2013.01); *H04Q 2213/13098* (2013.01); *H04Q 2213/13097* (2013.01); *H04Q 2213/13389* (2013.01)

(58) Field of Classification Search
USPC .................................. 370/328, 338, 401, 465
See application file for complete search history.

(56) References Cited

U.S. PATENT DOCUMENTS

| | | | | |
|---|---|---|---|---|
| 6,141,531 | A * | 10/2000 | Williams et al. ................... | 455/7 |
| 7,188,173 | B2 * | 3/2007 | Anderson et al. ............. | 709/225 |
| 8,301,178 | B1 * | 10/2012 | Breau et al. .................... | 455/465 |
| 8,868,083 | B2 * | 10/2014 | Wallis ............................ | 455/444 |
| 2007/0206563 | A1 * | 9/2007 | Silver et al. .................... | 370/351 |
| 2007/0249323 | A1 * | 10/2007 | Lee et al. ....................... | 455/411 |
| 2009/0328194 | A1 * | 12/2009 | Kim et al. ........................ | 726/15 |
| 2010/0048174 | A1 * | 2/2010 | Osborn .......................... | 455/411 |
| 2011/0150196 | A1 * | 6/2011 | Dwight et al. ........... | 379/142.04 |

* cited by examiner

*Primary Examiner* — Ricky Ngo
*Assistant Examiner* — Christine Ng
(74) *Attorney, Agent, or Firm* — Ding Yu Tan

(57) ABSTRACT

A method for using femtocell as a telephone exchange is provided. The method comprises the following steps. A femtocell registers to a core network via an Internet. The femtocell receives a phone call, and determines whether the phone call comes from the core network or the internal network. If the phone call comes from the core network, then the femtocell automatically answers the call and provides a prompt. The femtocell determines whether an input number of the phone call is an internal extension number. If the input number is the internal extension number, then the femtocell transfers the phone call to a corresponding internal extension.

10 Claims, 2 Drawing Sheets

METHOD FOR USING FEMTOCELL AS A TELEPHONE EXCHANGE

This application claims the benefit of People's Republic of China application Serial No. 201110340813.1, filed Nov. 2, 2011, the subject matter of which is incorporated herein by reference.

BACKGROUND OF THE INVENTION

1. Field of the Invention

The invention relates in general to a method for using femtocell as a telephone exchange.

2. Description of the Related Art

In the telecommunication industry, the femtocell is a cellular base station normally used in a household or a small business entity. The femtocell, connected to a telecom operator's core network via a broadband (such as digital subscriber line (DSL), cable or optical fiber), may integrate 2G, 3G and WiFi in one machine. However, the femtocell provides services only when there is user equipment (UE) within the service coverage, and thus has limited use.

SUMMARY OF THE INVENTION

The invention is directed to a method for using femtocell as a telephone exchange. The function of using the femtocell as a telephone exchange is provided after the femtocell is connected to a core network and successfully registers as a UE.

According to an embodiment of the present invention, a method for using femtocell as a telephone exchange is provided. The method comprises the following steps. A femtocell registers to a core network via an Internet. The femtocell receives a phone call, and determines whether the phone call comes from the core network or the internal network. If the phone call comes from the core network, then the femtocell automatically answers the call and provides a voice prompt. The femtocell determines whether an input number of the phone call is an internal extension number. If the input number is an internal extension number, then the femtocell transfers the phone call to a corresponding internal extension.

The above and other aspects of the invention will become better understood with regard to the following detailed description of the preferred but non-limiting embodiment(s). The following description is made with reference to the accompanying drawings.

DETAILED DESCRIPTION OF THE INVENTION

According to method for using femtocell as a telephone exchange of the disclosure, the function of using the femtocell as a telephone exchange is provided after the femtocell is connected to a core network and successfully registers as a UE.

Figure 1:
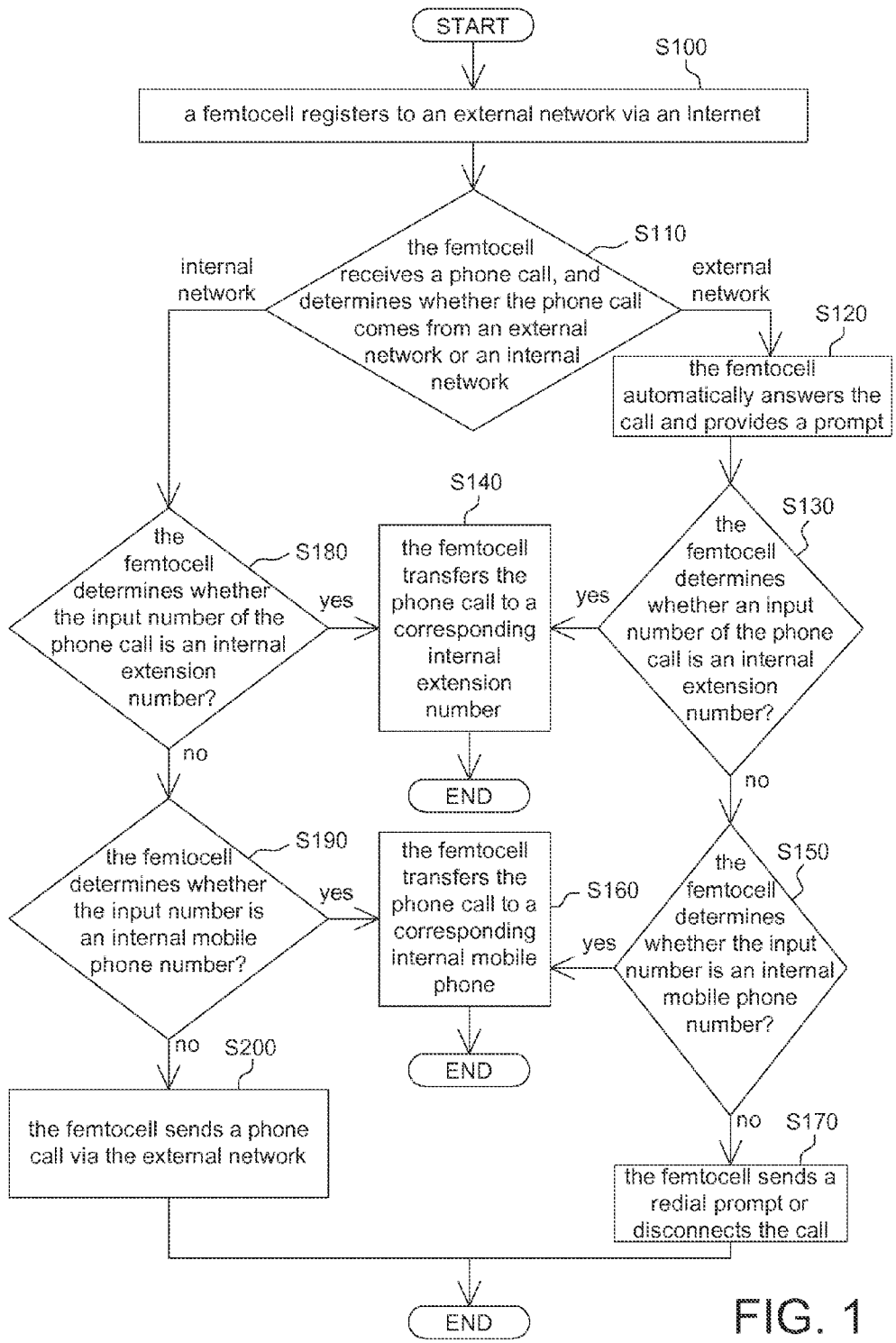
FIG. 1 shows a flowchart of a method of using femtocell as a telephone exchange according to an embodiment.
Figure 2:
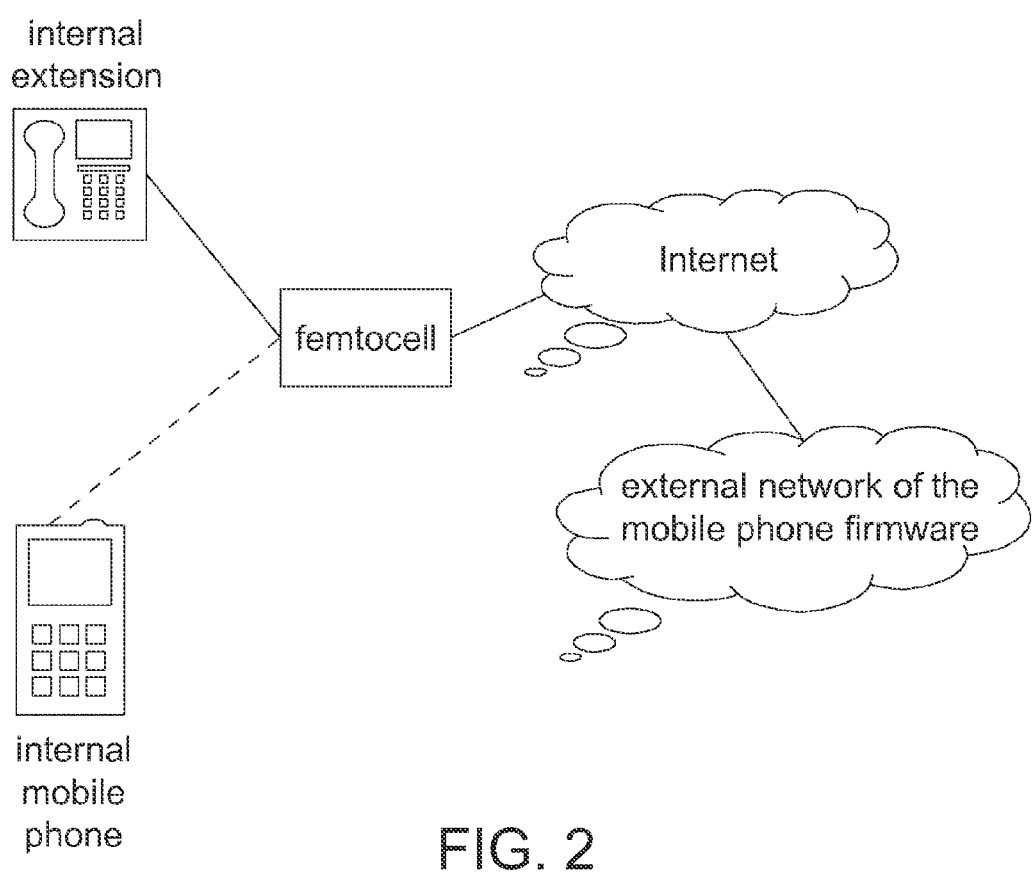
FIG. 2 shows a schematic diagram of a telecommunication system according to an embodiment.

Referring to FIG. 1 and FIG. 2. FIG. 1 shows a flowchart of a method of using femtocell as a telephone exchange according to an embodiment. FIG. 2 shows a schematic diagram of a telecommunication system according to an embodiment. In step S100, after a femtocell registers to a core network of the telecom operator via an Internet, the femtocell becomes a UE and resides in the core network, and the number of the UE is used as a representative number of the exchange. The number may be configured to the femtocell by the telecom operator for registering the femtocell to the core network, but the disclosure is not limited thereto.

In step S110, the femtocell receives a phone call, and determines whether the phone call comes from the core network or the internal network. If the phone call comes from the core network, then the method proceeds to step S120, the femtocell automatically answers the call and provides a voice prompt. The femtocell may play a tone to prompt the user to input an extension number or directly transfer the phone call to a line operator. In step S130, the femtocell determines whether an input number of the phone call is an internal extension number, wherein the femtocell has an internal extension number table to look up with. If the input number is an internal extension number, then the method proceeds to step S140, the femtocell transfers the phone call to a corresponding internal extension number. The femtocell may call the extension number through the internal network by such as the session initiation protocol (SIP).

If the input number is not an internal extension number, then the method proceeds to step S150, the femtocell determines whether the input number is an internal mobile phone number, wherein the femtocell has an internal mobile phone table to look up with. If the input number is an internal mobile phone number, then the method proceeds to step S160, the femtocell transfers the phone call to a corresponding internal mobile phone through its intrinsic femto function. If the input number is not an internal mobile phone number, then the method proceeds to step S170, the femtocell sends a redial prompt or disconnects the call.

If in step S110 the femtocell determines that the phone call comes from the internal network, then the method proceeds to step S180, the femtocell determines whether the input number of the phone call is an internal extension number, wherein the femtocell has an internal extension number table to look up with. If the input number is an internal extension number, then the method proceeds to step S140, the femtocell transfers the phone call to a corresponding internal extension number. If the input number is not an internal extension number, then the method proceeds to step S190, the femtocell determines whether the input number is an internal mobile phone number, wherein the femtocell has an internal mobile phone table to look up with. If the input number is an internal mobile phone number, then the method proceeds to step S160, the femtocell transfers the phone call to a corresponding internal mobile phone through its intrinsic femto function.

If the input number is not an internal mobile phone number, then the method proceeds to step S200, the femtocell sends a phone call via the core network. That is, an internal extension or an internal mobile phone makes a phone call to the core network via the femtocell according to the dial plan and the number of the femtocell (the telephone exchange number) will be the 'caller' of this call. Besides, if the internal mobile phone makes a phone call, the default method of the femtocell may be used without activating the telephone exchange function, and the number of the internal mobile phone will be the 'caller' of this call.

In addition, the femtocell may further be connected to a fax machine (FAX) via a foreign exchange subscriber (FXS). Thus, the connected fax machine is regarded as an extension, and the femtocell is able to provide facsimile function.

The disclosure proposes the method for using femtocell as a telephone exchange in the above embodiments, and the function of using the femtocell as a telephone exchange is provided after the femtocell is connected to a core network and successfully registers to the core network as a UE. Conversely, a conventional telephone exchange is connected to a core network via a public switched telephone network (PSTN), and the call capacity of the conventional telephone exchange is subjected to the number of PSTN lines. Meanwhile, using the femtocell as a telephone exchange saves the cost of PSTN access and extra wiring.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for using femtocell as a telephone exchange, wherein the method comprises:
    registering to a core network via an Internet by a femtocell, wherein the femtocell is registered to the core network as a user equipment (UE), the number of the user equipment (UE) is used as a representative number of the telephone exchange;
    receiving a phone call and determining by the femtocell whether the phone call comes from the core network or the internal network;
    automatically answering the call and providing a prompt by the femtocell if the phone call comes from the core network;
    determining by the femtocell whether an input number of the phone call is an internal extension number; and
    transferring the phone call to a corresponding internal extension by the femtocell if the input number is the internal extension number.

2. The method for using femtocell as the telephone exchange according to claim 1, further comprises:
    determining by the femtocell whether the input number is an internal mobile phone number if the input number is not the internal extension number;
    transferring the phone call to a corresponding internal mobile phone by the femtocell if the input number is the internal mobile phone number; and
    sending a redial prompt or disconnecting the call by the femtocell if the input number is not the internal mobile phone number.

3. The method for using femtocell as the telephone exchange according to claim 1, further comprises:
    determining by the femtocell whether the input number of the phone call is the internal extension number if the phone call comes from the internal network; and
    transferring the phone call to the corresponding internal extension by the femtocell if the input number is the internal extension number.

4. The method for using femtocell as the telephone exchange according to claim 3, further comprises:
    determining by the femtocell whether the input number is the internal mobile phone number if the input number is not the internal extension number;
    transferring the phone call to the corresponding internal mobile phone by the femtocell if the input number is the internal mobile phone number; and
    sending the phone call via the core network by the femtocell if the input number is not the internal mobile phone number.

5. The method for using femtocell as the telephone exchange according to claim 1, wherein the femtocell has an internal extension number table and radio frequency network components.

6. The method for using femtocell as the telephone exchange according to claim 1, wherein the femtocell has an internal mobile phone table.

7. The method for using femtocell as the telephone exchange according to claim 1, further comprising:
    connecting a fax machine as an extension to the femtocell by using a foreign exchange subscriber (FXS).

8. A method for using femtocell as a telephone exchange, wherein the method comprises:
    registering to a core network via an Internet by a femtocell, wherein the femtocell is registered to the core network as a user equipment (UE), the number of the user equipment (UE) is used as a representative number of the telephone exchange;
    receiving a phone call and determining by the femtocell whether the phone call comes from the core network or the internal network;
    automatically answering the call and providing a prompt by the femtocell if the phone call comes from the core network;
    determining by the femtocell whether the input number of the phone call is the internal extension number if the phone call comes from the internal network; and
    transferring the phone call to the corresponding internal extension by the femtocell if the input number is the internal extension number.

9. The method for using femtocell as a telephone exchange according to claim 8, wherein the femtocell is registered as a user equipment when registering to the core network via the internet.

10. The method for using femtocell as a telephone exchange according to claim 8, wherein the femtocell comprises radio frequency network components.

* * * * *